United States Patent Office 3,407,353
Patented Oct. 22, 1968

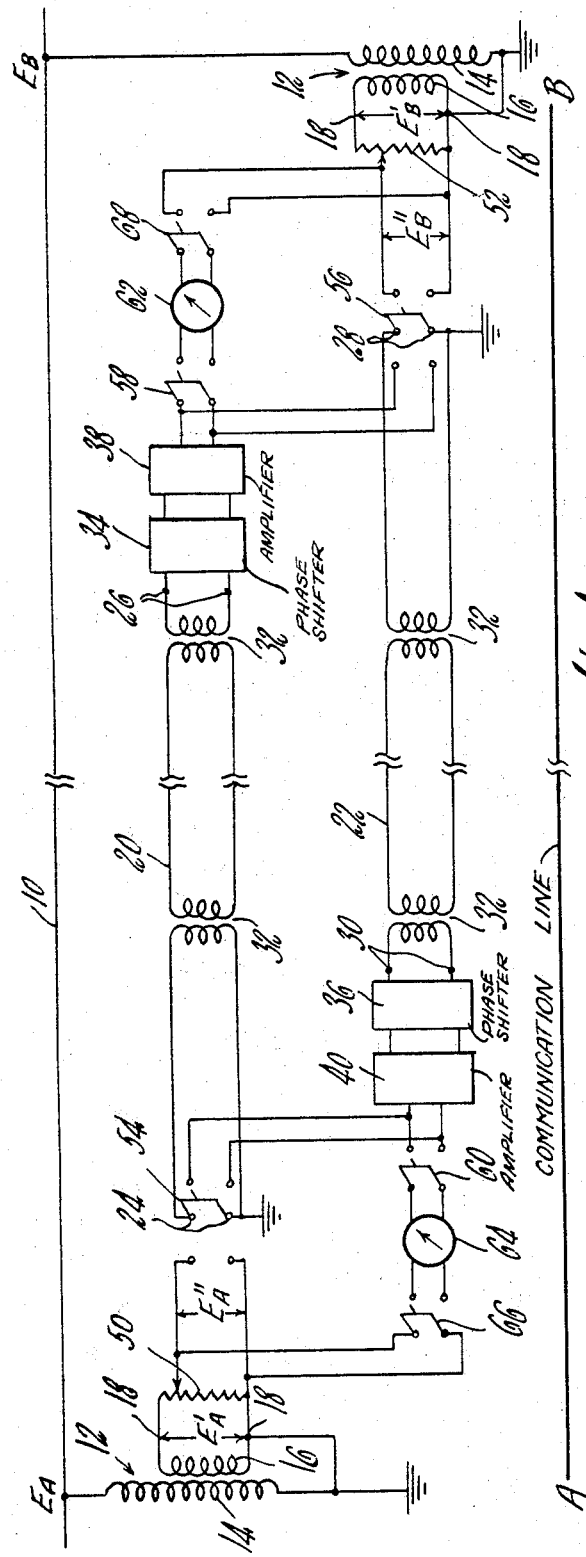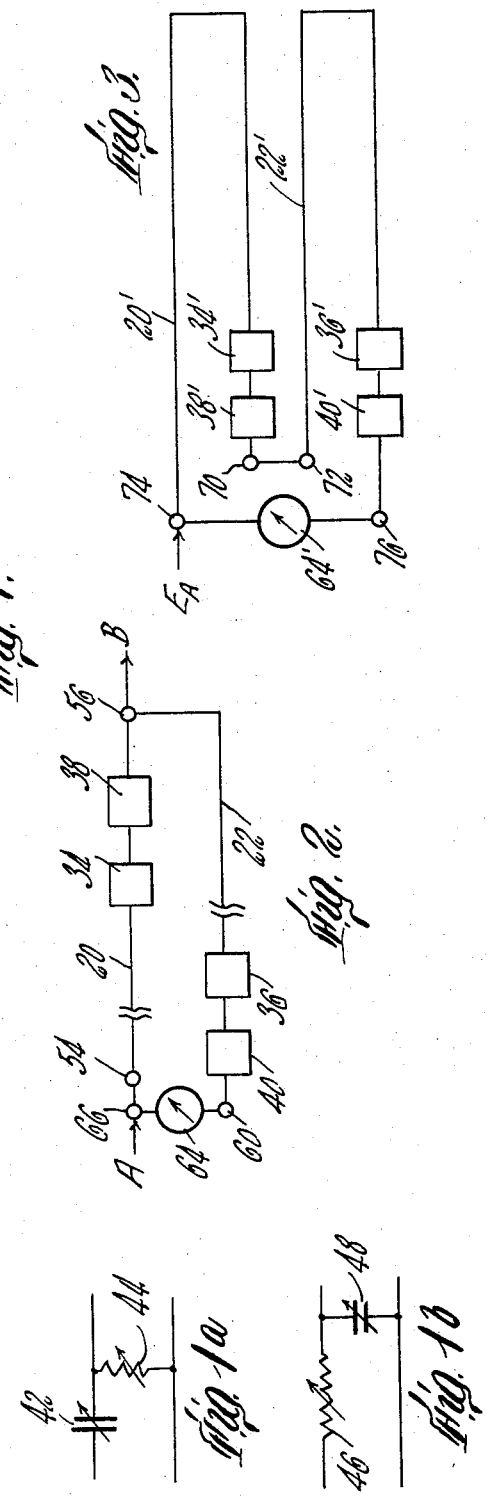

3,407,353
METHOD AND APPARATUS FOR COMPENSATING AN ELECTRICAL SIGNAL TRANSMISSION PATH
Frank C. Doble, Belmont, Mass., assignor to Doble Engineering Company, Belmont, Mass., a corporation of Massachusetts
Continuation of application Ser. No. 328,824, Dec. 9, 1963. This application Mar. 1, 1967, Ser. No. 619,874
11 Claims. (Cl. 324—83)

ABSTRACT OF THE DISCLOSURE

For measuring phase shifts in high voltage line extending between points A and B, two pilot lines are provided between points A and B. The pilot lines include telephone lines and isolating transformers and passive phase shift networks are employed to adjust the pilot lines to have identical phase shift characteristics. At the receiving end of each pilot line is connected an adjustable compensation network that includes a phase shifter and an adjustable high input impedance amplifier. The combined phase shift of the two pilot lines connected in series is measured and the compensation networks are adjusted until the total phase shift of the two lines reaches a minimum, thus effectively compensating either pilot line to zero phase shift.

---

This application is a continuation of Ser. No. 328,824, filed Dec. 9, 1963, and now abandoned.

This invention relates to electrical transmission systems and more particularly to methods and apparatus particularly related to the improved transmission of phase information between widely spaced points.

Phase information is an important factor in the control of electrical energy in an electrical power transmission system. For example, the flow of electrical energy between any two points in a power system depends primarily on the difference in phase angle between the two points and power will flow from one point to another only when the phase angle at the first point is in advance of the phase angle at the second point. Also, the difference in phase angles affects the amount of power that can be transmitted between the two points and by changing the phase angle, the power flow can be increased or decreased as desired. A typical method of changing the phase angle is to cause a momentary change in frequency. When such a change in frequency is made, the stability of the interconnected power system must be taken into consideration for when the phase angle reaches a relatively large value, a transient change in load, for example, as may be caused by power swings, may cause the system to exceed its limit of electrical stability and drop its entire load. Also, the small differences in phase which may occur between two points in electrical systems can produce disproportionately large values of circulating current.

It is thus evident that accurate phase relation information at widely spaced points on a power system is of significant interest and it is a principal object of this invention to provide novel and improved methods and apparatus for providing accurate phase information suitable for use in the control of electrical power systems.

While conventional signalling lines such as pilot lines are available for transferring information between widely spaced points, a principal problem in the transmission of information concerning phase relations at one point to a distant point is that the transmission link itself has phase shift characteristics which must be taken into account. Also, in a typical electrical power system, the relevant phase information is associated with high voltages and substantial danger and difficulty is associated with the making of accurate measurements at the power transmission voltages. Therefore, it is another object of this invention to provide novel and improved apparatus and methods for providing phase information at safe working voltages that are accurately related both in phase and magnitude to the actual electrical power system voltages under investigation, which phase information is an accurate and direct function of phase relations at widely spaced points on the power system.

Another object of the invention is to provide novel and improved phase measuring apparatus which is convenient to use and which provides highly accurate phase information.

Another object of the invention is to provide novel and improved methods and apparatus for transmitting electrical information between widely spaced points.

A further object of the invention is to provide novel and improved methods and apparatus for effectively compensating, quickly and accurately, phase shift and attenuation characteristics of electrical transmission paths.

Still another object of the invention is to provide novel and improved methods and apparatus employing low voltage lines for the transmission of accurate phase information between widely spaced points of an electrical system.

In accordance with the invention, there is provided apparatus and methods for compensating a pilot line or other transmission path to provide effectively a zero phase shift from input to output between the two widely spaced points. In the practice of the invention, a duplicate pilot line or other transmission path is employed which has or is compensated to have passive electrical characteristics equal to the first line or other path. These characteristics can be readily ascertained by bridge measurements or other techniques well known to those skilled in the art and any electrical differences which may exist between the lines can be readily compensated by small passive electrical networks. The two lines may extend in physically parallel relation between the two points over which it is desired to transmit phase information but this is not a necessary facet of the invention. Identical compensation means, each preferably including an adjustable phase shifter and a high input impedance amplifier of adjustable gain and negligible phase shift, are connected to the respective lines so that one compensation means is disposed at each point. The two lines with the compensation means are connectable in series so a circuit may be completed from one point to the other and return to the one point. Suitable synchronizing controls are provided to that the two compensation means at the two spaced points may be incrementably varied from the same initial settings in steps in the same direction and of the same magnitude.

In the compensation operation, the two lines and compensation means are connected in series and the system is initially adjusted so that the output voltage from each compensation means is preferably equal in magnitude to the input voltage applied to its line. Thus, at this setting, the compensation means impose equal terminal loads on the two pilot lines, the electrical characteristics of the two lines are identical, and the input voltage to each line is the same.

Under this condition, the resulting phase shifts in each line are the same. The phase shifting elements of the compensation means in each line are then varied in synchronized increments in the same direction until the phase difference between the input signal and the output signal at the sending point is zero. Under this condition the phase shift of each line has been completely compensated by the compensating means so that the total phase shift through the pilot line and coupled compensation means is essentially zero. Under this condition a signal transmitted over either compensated pilot line will be of the same phase at the receiving point as it was at the sending point. Thus, the invention renders relative phase information available at widely spaced points on the system notwithstanding the inherent phase shift in the transmission path linking those two points. A further incidental feature obtained is that the output signal can be made the same magnitude as the input signal.

With the method and apparatus of the invention, it is thus possible to provide accurate phase information at a plurality of widely spaced points, which information may be useful in controlling and improving the operation of large power systems.

Other objects, features and advantages of the invention will be seen as the following description of a preferred embodiment of the invention progresses, in conjunction with the drawing, in which:

FIG. 1 is a schematic diagram partially in block form showing apparatus employed in compensating pilot transmission paths in accordance with the invention to enable the accurate measurement of the phase angle between two widely spaced points on a high voltage electrical power system;

FIGS. 1a and 1b are diagrams of suitable phase adjusting networks;

FIG. 2 is a one-line diagram of the system of FIG. 1; and

FIG. 3 is a one-line diagram of a verification circuit in which the transmission paths are looped back on themselves and connected end to end to verify the accuracy of the compensation provided by the invention.

While the apparatus and method of the invention is shown in conjunction with a high voltage electrical power transmission system, it will be understood that the invention is not limited to use in connection with such systems and may be employed to provide phase compensated data transmission links between widely spaced points for other applications. With reference to FIG. 1 there is provided a high voltage transmission line generally diagrammatically indicated at 10 which extends between two widely spaced points A and B. Typically, such a line is three-phase. However, adequate phase information can generally be obtained from a single phase as indicated. The high voltage signal may be reduced to a working voltage by well-known devices, for example, the potential transformers 12, to provide respective voltages $E_A'$ and $E_B'$, each potential transformer having a primary winding 14 and a secondary winding 16 with output terminals 18. Although potential transformers are shown in the drawing other potential reducing devices such as those disclosed in the United States Patents 2,922,951, 2,922,952, and 3,011,123 may also be employed to provide working voltages accurately related to the system high voltage both in ratio and in phase.

The phase transmission system employs two pilot lines 20, 22, line 20 having input terminals 24 adjacent point A and output terminals 26 adjacent point B, while line 22 has input terminals 28 adjacent point B and output terminals 30 adjacent point A. These pilot lines have identical electrical characteristics, either in actuality or as compensated by passive networks, for example, to provide equal electrical characteristics.

Where the pilot transmission paths 20 and 22 are telephone lines, one side may be grounded in conventional manner as at terminals 24 and 28, for example. Such grounds produce capacitive unbalance and permit stray ground currents to flow through the pilot circuits. These effects are not only detrimental to telephone operations, but may also introduce uncompensatable errors into the phase measurements, but such errors may be eliminated by the use of isolating transformers 32 which usually have one-to-one ratios with their impedances related to the line impedance so they have minimal effect on the line characteristics. Typically, it has been found advisable to employ a transformer 32 at the output end of each line that has a higher impedance than the transformer 32 at the input end to avoid undue signal attenuation. These isolating transformers form a part of the line and, while they may have a modifying effect on the line impedance, automatic compensation for this effect is achieved by adjustment of the phase shifting networks to provide the two lines with identical passive electrical characteristics as indicated above.

If the impedances of the two equal pilot lines are linear, that is, are independent of voltage, their phase shifts remain equal, even with different applied voltages. However, when transformers with iron cores are used the saturation of the iron changes with the applied voltage. This changes the impedances of the transformers making them non-linear and dependent on the voltage. Since the transformer impedance forms a part of the impedance of each pilot line, the phase shift in each line accordingly will be dependent on the voltage applied to the line. Thus, to insure equal phase in the two lines and hence accurate phase measurements, it is necessary to operate the two lines at the same input voltage when transformers with iron cores are used.

At the receiving terminals 26, 30 of each line, there is connected an adjustable compensation network including a phase shifter 34, 36 which may be of the type shown in FIGS. 1a or 1b and an isolator in the form of an adjustable amplifier 38, 40, capable of producing a gain greater than one. Other phase shifters such as the movable rotor types may also be employed. Each amplifier preferably has a high input impedance and a constant phase shift which ideally is zero. The two compensation networks are identical so that the two lines coupled to them respond in identical manner to changes therein.

The compensation circuit shown in FIG. 1a includes an adjustable capacitor 42 connected in series with the pilot line and an adjustable resistor 44 connected across the lines while the compensation circuit of FIG. 1b includes a series adjustable resistor 46 and a parallel adjustable capacitor 48. Other networks of passive components may also be employed including the use of inductance in different combinations with resistance or capacitance, or both, depending on the electrical characteristics of the pilot line. In a fifteen mile telephone line, which has a normal phase shift of 45°, a compensation network of the type shown in FIG. 1a with resistor 44 set to 50,000 ohms and capacitor 42 set to 0.0508 microfarad, provides complete phase compensation.

Connected between the working voltages $E_A'$ and $E_B'$ and the input terminal of the corresponding pilot line 20, 22, respectively, is a potentiometer 50, 52 which may be employed to adjust the voltage to a desired output voltage $E_A''$, $E_B''$, and a double pole double throw switch 54, 56. The output terminals of each compensation network may be similarly connected through switch 56 or 54, respectively, to the input terminals or the other line, or through switch 58, 60, respectively, to a phase meter 62, 64. The phase meters in turn are connectable to the input voltages $E_A''$ and $E_B''$ through switches 66 and 68 respectively. It will be noted that the illustrated circuit relation is symmetrical with respect to the two transmission paths 20, 22.

With this system in operation each of the pilot lines 20, 22 may be compensated for zero voltage attenuation and zero phase shift. In order to accomplish this the phase shifters 34, 36 are initially set to equal values (after the lines have been made to have equal electrical characteristics if necessary as by means of a bridge measurement). Switches 54 and 56 are closed to their left terminals, and switches 60 and 66 are closed. This system arrangement is shown in FIG. 2 in a single line diagram. Amplifiers 38 and 40 are then adjusted so that the voltages of the output terminals of each amplifier equal the input voltage $E_A''$ (as measured by voltmeters (not shown)). In this manner the signal provided at the output of the amplifier connected to line 20 is equal in magnitude to the input signal to that line. With switch 56 closed as indicated above the signal is applied to the input of line 22. The output from line 22 at point A is equal in magnitude to the input voltage $E_A''$. The phase shift indicated by meter 64 is twice that of either line 20 and its compensating network or line 22 and its compensating network.

The phase shifters 34, 36 are initially set to equal values and subsequent incremental adjustments of the phase shifters and adjustments of the amplifiers are made in substantial synchronism by a suitable control link or by telephone communication between operators at points A and B. For example, the operator at point A makes an incremental corrective adjustment of the phase-shifting device 36, such as making a small change in the resistor 44 and the capacitor 42 shown in FIG. 1a or in the resistor 46 and capacitor 48, shown in FIG. 1b, depending on which type of network is used. The operator at A then communicates the amount of the adjustment which he has just made to the operator at B who makes the same adjustment in his phase-shifting device 34 and at the same time, the operator at A notes when the angle as indicated by phase meter 64 has decreased. The operator at point A then makes a second incremental corrective adjustment of his phase-shifting device 36 and again communicates its value to the operator at point B who again makes an equal adjustment of line-phase-shifting device 34. These successive adjustments are continued, the indication of the phase meter 64 decreasing with each subsequent adjustment until the phase meter reads zero, showing zero phase shift, or complete phase compensation, for the two lines looped in series. It should be noted that it may be necessary to readjust the amplifiers to maintain the same voltages at points A and B after each successive adjustment of each of the phase shifters.

Since the two lines 20 and 22 are equal electrically, the same phase shifting adjustments having been made for each, and the total phase shift has become zero, the phase shift of each line must now be zero. Hence, a signal applied at terminals 24 of line 20 at point A will at the output of amplifier 38 be unchanged in phase; likewise a signal applied at terminals 56 of line 22 will at the output of amplifier 40 be unchanged in phase. Switches 54, 56, 60 and 66 may then be opened and pilot line 20 is now available to indicate accurately at point B the phase angle of a signal applied to terminals 24 at point A; likewise line 22 is now available to indicate accurately at point A the phase angle of a signal applied to terminals 28 at point B.

To measure the phase angle between a working voltage such as $E_A''$ at point A and a working voltage $E_B''$ at point B, switches 56, 60 and 66 remain open; switch 54 is closed to the left which couples terminals 24 to the signal $E_A''$, and switches 58 and 68 are then closed which couples phase meter 62 between the output of amplifier 38 and signal $E_B''$. Since pilot line 20 has been completely compensated relative to phase shift, phase meter 62 indicates accurately the phase angle between the two working voltages $E_A''$ and $E_B''$.

Since line 22 has also been compensated, it is available to measure the phase angle between $E_B''$ and $E_A''$. To make this measurement, switches 54, 58 and 68 are opened; switch 56 is closed to the right and switches 60 and 66 are closed. The phase meter 64 now measures the phase angle between voltages $E_B''$ and $E_A''$. Obviously, since the phase angle between voltages $E_A''$ and $E_B''$ is equal to that between $E_B''$ and $E_A''$, a comparison of these two measurements is a check on the equality of the compensation of lines 20 and 22 and also on the accuracy of the over-all phase measurements. Since working voltages $E_A''$ and $E_B''$ accurately correspond to high voltages $E_A$ and $E_B$, respectively, the measured phase angle between voltages $E_A''$ and $E_B''$ is also an accurate indication of the phase angle between high voltages $E_A$ and $E_B$.

In order to verify the method of compensating two pilot circuits in accordance with this invention, two two-wire pilot-circuit loops, each approximately fifteen miles in length, were tested with each pair of terminals of each loop disposed at the same location. This made it possible to measure directly any phase change in either loop, as well as the total phase change when the loops were connected end-to-end. This system is represented by a one-line diagram shown in FIG. 3 and corresponding elements are designated by primed numbers. Since only the pilot-circuits themselves were tested, the high-voltage line and potential transformers of FIG. 1 are not shown. Referring to FIG. 3, the far ends of the pilot-circuits 20' and 22' and their associated elements were looped back to the starting location. Terminals 70 of line 20' were coupled to terminals 72 of line 22' as shown. A signal $E_A$ was first applied to terminals 74 of pilot circuit 20' and the voltages at terminals 70 and 76 were adjusted by means of the amplifiers 38' and 40' until they were equal to the voltage of the signal $E_A$ applied at terminals 74. These voltages were maintained constant at this value while making the phase compensation. The phase meter 64' was coupled between terminals 74 and 76 and the phase shift networks 34' and 36' were adjusted in equal increments in accordance with the procedure heretofore described, until the phase meter 64' indicated zero, or a minimum, phase difference between terminals 74 and 76. The signal $E_A$, at terminals 74, was then removed and terminals 70 and 72 were separated. A phase meter such as 64' was coupled between terminals 70 and 74, and a second similar phase meter was coupled between terminals 72 and 76. A signal was applied to terminals 74 and another signal was applied to terminals 72.

Each of the aforesaid phase meters should read zero indicating that each line had been correctly compensated. The actual measurements were as follows:

|  | Minutes |
|---|---|
| Minimum phase shift of total loop with phase meter connected between terminals 74 and 76, (approximately 0.18°) | 11 |
| Phase shift of line 20' after separation with phase meter connected between terminals 70 and 74, (approximately 0.16°) | 10 |
| Phase shift of line 22' after separation with phase meter connected between terminals 72 and 76, (approximately 0.13°) | 8 |

The phase shift in each line when uncompensated was 44.6° and 45°, respectively. These very small residual angles are a confirmation of the high accuracy in the phase compensation of pilot lines which is attainable with this invention.

While a preferred embodiment of the invention has been shown and described, various modifications thereof will be apparent to those skilled in the art. The compensation method and apparatus of the invention have been described in connection with a high voltage power system embodiment, but it will be understood that they are applicable to other electrical systems. Also other types of transmission paths may be employed in the practice of the invention. Therefore, it is not intended that the invention be limited to the disclosed embodiment or to details thereof and departures may be made therefrom within the spirit and scope of the invention as defined in the claims.

What is claimed is:

1. Phase measuring apparatus for voltages appearing at two relatively widely spaced locations comprising:
   a pair of pilot lines having identical electrical characteristics,
   a first pilot line adapted to transmit to a second location a first voltage applied at a first location,
   voltage amplifying means connected to said first pilot line at said second location capable of compensating the attenuation produced in said first voltage by said first pilot line,
   phase shifting means connected to said first pilot line at said second location capable of compensating the phase shift produced in said first voltage by said first pilot line, a second pilot line adapted to transmit to said first location a second voltage applied at said second location, voltage amplifying means connected to said second pilot line at said first location capable of compensating the attenuation produced in said second voltage by said second pilot line, phase shifting means connected to said second pilot line at said first location capable of compensating the phase shift produced in said second voltage by said second pilot line, voltage adjusting and voltage measuring means at said first and second locations, communication means between said first and second locations for interchanging information between said locations, means at said second location to apply the output of said first pilot line to said second pilot line, means to apply a first working voltage to said first pilot line at said first location, and means at said first location to connect between the output of said second pilot line and the input to said first pilot line a phase meter to indicate when the combined phase shift in said first and second pilot lines attains a null value.

2. The apparatus as claimed in claim 1 wherein each said pilot line is isolated from ground by a pair of isolating transformers.

3. The apparatus as claimed in claim 1 wherein each said voltage amplifying means includes a high input impedance voltage amplifier having negligable phase shift characteritics.

4. The apparatus as claimed in claim 1 wherein each said phase shifting means includes adjustable resistive and capacitive elements.

5. The apparatus as claimed in claim 1 for providing phase information with respect to high voltages at said first and second locations further including:

means to derive a first low working voltage from the high voltage appearing at said first location, and means to derive a second low working voltage from the high voltage appearing at said second location.

6. The apparatus as claimed in claim 5 wherein each said phase shifting means includes adjustable resistive and capacitive elements.

7. The apparatus as claimed in claim 6 wherein each said voltage amplifying means includes a high input impedance voltage amplifier having negligable phase shift characteristics.

8. The apparatus as claimed in claim 7 wherein each said pilot line is isolated from ground by a pair of isolating transformers.

9. Electrical signalling apparatus for transmitting phase information between first and second spaced locations comprising:

two transmission paths having identical electrical characteristics extending between said two locations, two identical loads, each load being connected to a corresponding transmission path in the same position with respect to the direction of signal transmission over that path as the other load is connected relative to its transmission path so that the loads and paths are in the same position relative to one another, each said load including adjustable amplifier means and adjustable phase shift means, means at said second location to connect the output of the combination of one load and transmission path to the combination of the other load and transmission path, means to adjust said phase shift means, and means at said first location for measuring the combined phase shift of said two said transmission paths and loads.

10. A method of compensating a first transmission path capable of transmitting electrical information between two widely spaced locations, comprising the steps of:

connecting first adjustable phase shift means to said first transmission path, providing a second transmission path having the same electrical characteristics as said first transmission path with second adjustable phase means identical to said first adjustable phase shift means connected thereto in the same position with respect to the direction of signal transmission over said second transmission path as the connection of said first adjutable phase shift means to said first transmission path, connecting aid second transmission path in series with said first transmission path, applying a signal over said two transmission paths connected in series, and adjusting the phase shift of each path until the total phase shift imparted to the transmitted signal by the two series connected paths reaches a minimum.

11. The method of measuring the phase angle between a first high voltage appearing at a first location and a second high voltage appearing at a second location, said locations being relatively widely spaced from each other, comprising the steps of:

producing a first low working voltage in known proportion to said first high voltage and in phase therewith, producing a second low working voltage in known proportion to said second high voltage and in phase therewith, providing a first transmission path capable of transmitting electrical information between said two spaced locations, connecting a second transmission path having the same electrical characteristics as said first transmission path and extending between said two locations in series with said first transmission path, applying a signal over said two transmission paths connected in series, maintaining equality of signal magnitude at the output of each transmission path, adjusting the phase shift of each path by phase shift means located in each path in the same position with respect to direction of signal transmission over that path until the total phase shift imparted to the transmitted signal by the two series connected paths reaches a minimum to provide a compensated transmission path, and measuring the phase angle between one of said working voltages and the output signal from one compensated transmission path produced by the other of said working voltages.

References Cited

UNITED STATES PATENTS 2,214,130 10/1940 Green et al. _____ 324—57 X
2,284,612 5/1942 Green et al. _____ 333—18 X RUDOLPH V. ROLINEC, *Primary Examiner.*

P. F. WILLE, *Assistant Examiner.*